US009434218B2

(12) United States Patent
Root (10) Patent No.: US 9,434,218 B2
(45) Date of Patent: Sep. 6, 2016

(54) TIRE INFLATION APPARATUS (71) Applicant: ACCURIDE CORPORATION, Evansville, IN (US)

(72) Inventor: Jeffrey Root, Howell, MI (US)

(73) Assignee: ACCURIDE CORPORATION, Evansville, IN (US)

(*) Notice: Subject to any disclaimer, the term of this patent is extended or adjusted under 35 U.S.C. 154(b) by 0 days.

(21) Appl. No.: 14/428,597

(22) PCT Filed: Mar. 12, 2013

(86) PCT No.: PCT/US2013/030343
§ 371 (c)(1),
(2) Date: Mar. 16, 2015

(87) PCT Pub. No.: WO2014/051677
PCT Pub. Date: Apr. 3, 2014

(65) Prior Publication Data
US 2015/0239309 A1    Aug. 27, 2015

Related U.S. Application Data (60) Provisional application No. 61/707,040, filed on Sep. 28, 2012.

(51) Int. Cl.
*B60C 23/00* (2006.01)
*B60C 23/12* (2006.01)
(Continued)

(52) U.S. Cl.
CPC .............. *B60C 23/12* (2013.01); *B60C 23/004* (2013.01); *B60C 23/041* (2013.01); *F04B 27/005* (2013.01); *F04B 35/002* (2013.01); *F04B 39/08* (2013.01)

(58) Field of Classification Search
CPC ... B60C 23/00; B60C 23/001; B60C 23/003; B60C 23/004; B60C 23/10; B60C 23/16; B60C 29/00
See application file for complete search history.

(56) References Cited

U.S. PATENT DOCUMENTS 3,366,066 A    1/1968   Levey
4,539,497 A *  9/1985   Boyer .................. B60C 23/041
                                                       180/65.51

(Continued)

FOREIGN PATENT DOCUMENTS

DE   10 2010 011 124 A1   12/2011
WO       97/02961 A1       1/1997

OTHER PUBLICATIONS

International Search Report and Written Opinion of the International Searching Authority, International Patent Application No. PCT/US2013/030343, mailed May 21, 2013 (10 pages).

*Primary Examiner* — John Walters
*Assistant Examiner* — James Triggs
(74) *Attorney, Agent, or Firm* — Michael Best & Friedrich LLP (57) ABSTRACT

A tire inflation apparatus includes a housing coupled for co-rotation with a vehicle wheel, which includes a rim and a tire. The apparatus also includes a pendulum coupled to the housing for relative rotation therewith, a mechanically actuated pump coupled to the housing and operated in response to relative rotation between the housing and the pendulum, a valve positioned downstream of the pump and movable between a closed position in which pressurized air generated by the pump is prevented from being transferred to an air chamber between the rim and the tire, and an open position in which the pressurized air may be transferred to the air chamber, an electrically powered actuator coupled to the valve for moving the valve to at least one of the open and closed positions, and a generator operable to convert rotational kinetic energy of the wheel to electrical energy to power the actuator.

33 Claims, 10 Drawing Sheets

(51) Int. Cl.
*B60C 23/04* (2006.01)
*F04B 27/00* (2006.01)
*F04B 35/00* (2006.01)
*F04B 39/08* (2006.01)

(56) References Cited

U.S. PATENT DOCUMENTS

| | | | |
|---|---|---|---|
| 4,924,926 A | 5/1990 | Schultz et al. | |
| 5,325,902 A | 7/1994 | Loewe et al. | |
| 5,345,963 A | 9/1994 | Dietiker | |
| 5,409,049 A | 4/1995 | Renier | |
| 5,505,080 A * | 4/1996 | McGhee | B60C 23/12 116/34 R |
| 5,556,489 A * | 9/1996 | Curlett | B60C 23/12 152/418 |
| 5,653,880 A | 8/1997 | Mouton | |
| 5,667,606 A | 9/1997 | Renier | |
| 5,947,696 A | 9/1999 | Baumgarten | |
| 6,711,955 B1 | 3/2004 | Wilkerson, Jr. | |
| 6,744,356 B2 | 6/2004 | Hamilton et al. | |
| 7,013,931 B2 * | 3/2006 | Toit | B60C 23/12 141/38 |
| 7,145,256 B2 * | 12/2006 | Koharcheck | B62J 6/08 290/1 R |
| 7,232,292 B2 | 6/2007 | Lopatinsky et al. | |
| 7,408,453 B2 | 8/2008 | Breed | |
| 7,887,143 B2 | 2/2011 | Taylor et al. | |
| 2011/0184669 A1 | 7/2011 | Liberge et al. | |

* cited by examiner

TIRE INFLATION APPARATUS

CROSS-REFERENCE TO RELATED APPLICATIONS

This application is a national stage entry under 35 U.S.C. 371 of co-pending International Patent Application No. PCT/US2013/030343 filed Mar. 12, 2013, which claims priority to U.S. Provisional Patent Application No. 61/707,040 filed Sep. 28, 2012, the entire contents of both of which are incorporated herein by reference.

FIELD OF THE INVENTION

The present invention relates to tire inflation systems, and more particularly to tire inflation systems for use with vehicles.

BACKGROUND OF THE INVENTION

Some vehicles, such as tractor or semi-tractors, include on-board tire inflation systems for maintaining and/or adjusting the inflation of its tires. For example, tire inflation can be adjusted from the cab of the semi-tractor in accordance with the terrain over which the semi-tractor is driving. Also, tire inflation can be maintained at a specified value or within a range of specified values over a period of time to maximize fuel economy of the semi-tractor.

Central Tire Inflation Systems (commonly called CTIS systems) are commonly installed in military vehicles to allow the operator to quickly tailor the vehicles' tire inflation pressures to match the road conditions via a control panel located in the cab. These CTIS systems tie all the vehicles tires, via pneumatic lines, to a central air compressor that has enough capacity to quickly inflate all a vehicle's tires from a low pressure (e.g., 20 psi) used in soft sand to a high inflation pressure (e.g., 100 psi) suitable for high speed travel on a smooth highway. Modified versions of the military CTIS system have been adopted by the civilian market to maintain tires on a vehicle at an optimal pressure to maximize fuel economy and tire life while operating at high speed on a smooth highway. The typical civilian CTIS systems, like the military versions, have a high maintenance union that couples each tire to a non-rotating pneumatic line. The maintenance costs to ensure leak-free operation of multiple rotating unions and pneumatic line connections in typical civilian CTIS systems often outweigh the operational savings.

SUMMARY OF THE INVENTION

The invention provides, in one aspect, a tire inflation apparatus for use with a vehicle wheel. The apparatus includes a housing coupled for co-rotation with the wheel, which includes a rim and a tire mounted thereto. The apparatus also includes a pendulum coupled to the housing for relative rotation therewith, a mechanically actuated pump coupled to the housing and operated in response to relative rotation between the housing and the pendulum, a valve positioned downstream of the pump and movable between a closed position in which pressurized air generated by the pump is prevented from being transferred to an air chamber between the rim and the tire, and an open position in which the pressurized air may be transferred to the air chamber, an electrically powered actuator coupled to the valve for moving the valve to at least one of the open and closed positions, and a generator operable to convert rotational kinetic energy of the wheel to electrical energy to power the actuator.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
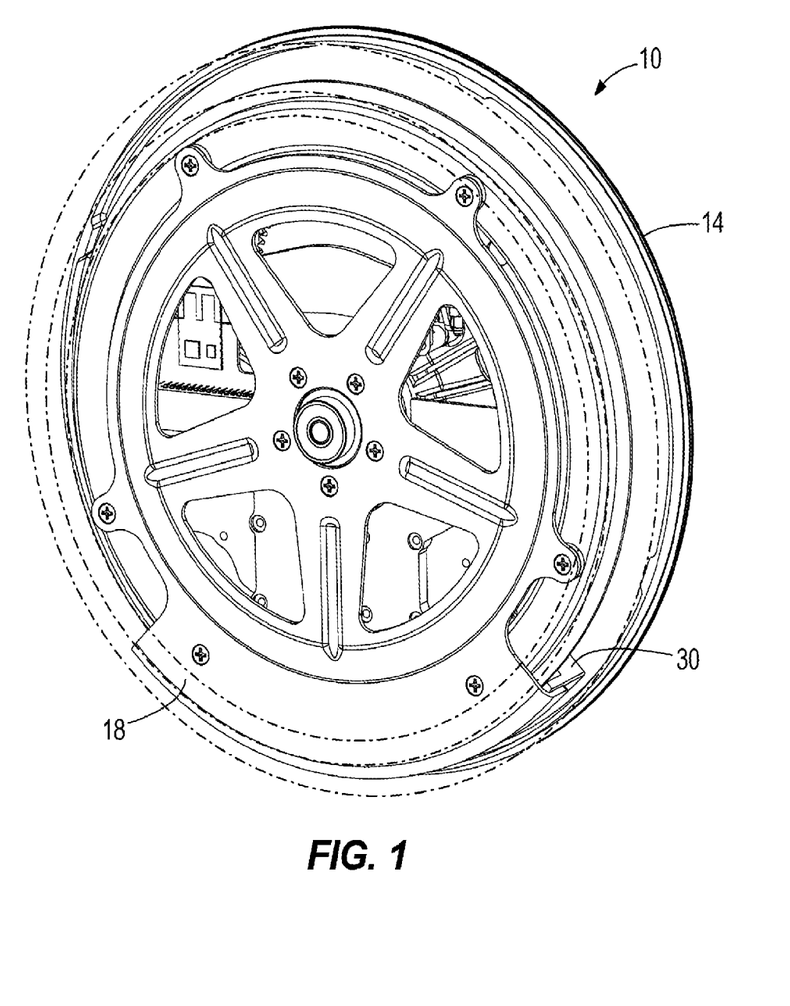
FIG. 1 is a front perspective view of a tire inflation apparatus of the invention.
Figure 2:
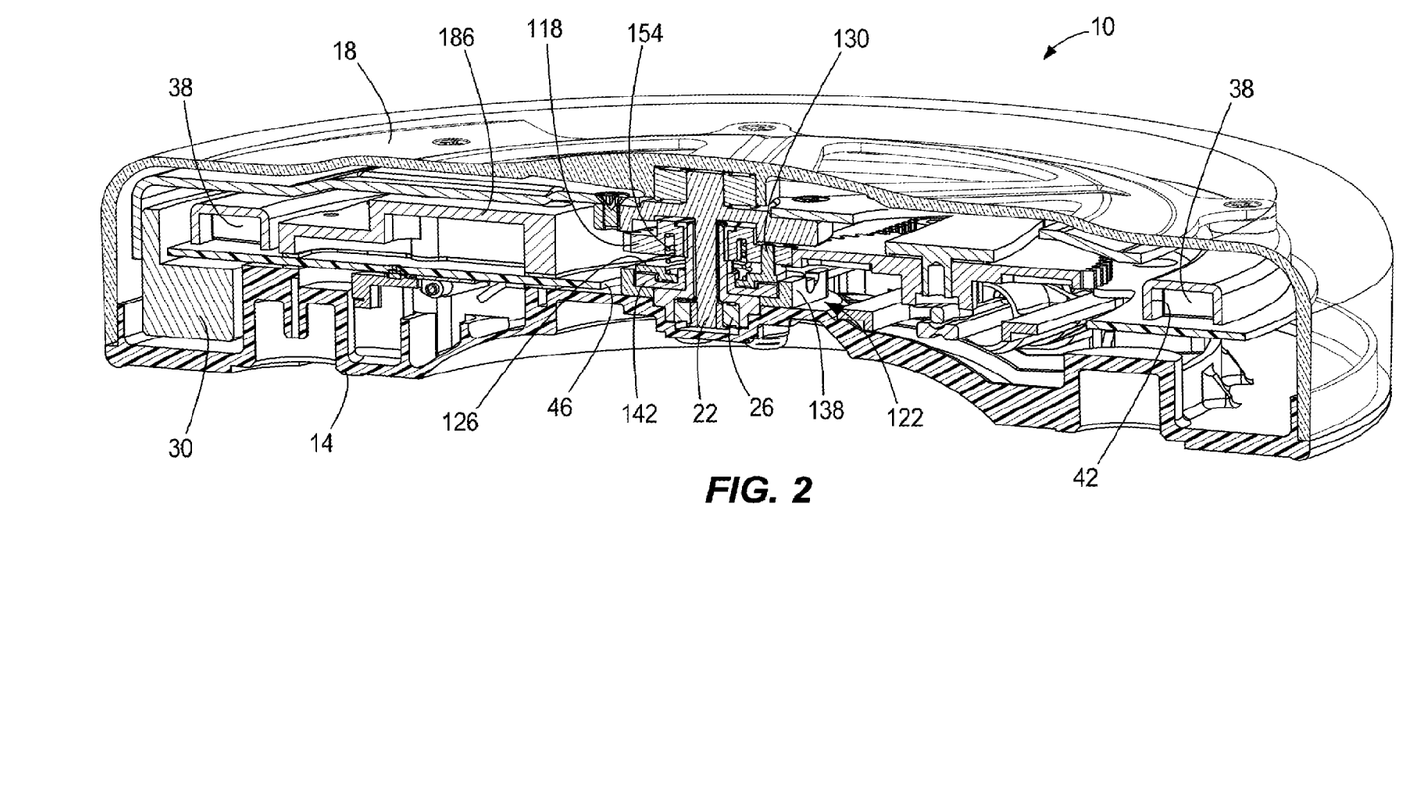
FIG. 2 is a cross-sectional view of the tire inflation apparatus of FIG. 1.

FIGS. 1 and 2 illustrate a tire inflation apparatus 10 for use with one or more wheels or wheel assemblies of a vehicle (e.g., a semi-tractor). Alternatively, the tire inflation apparatus 10 may be configured for use with any of a number of different vehicles (e.g., cars, vans, trucks, tractors, etc.). As is described in greater detail below, a single tire inflation apparatus 10 may be used for each wheel or each wheel assembly to monitor and adjust the pressure within the tires of each of the wheels or wheel assemblies. Such a wheel may include a rim and a single tire mounted thereto, while such a wheel assembly may include two or more interconnected rims, each having a pneumatic tire mounted thereto. For example, the tire inflation apparatus 10 may be used to maintain the pressure in the tire of a particular wheel or the tires of a particular wheel assembly in accordance with a predetermined minimum threshold value or range of values for maximizing fuel efficiency of the vehicle and/or tire life.

Figure 5:
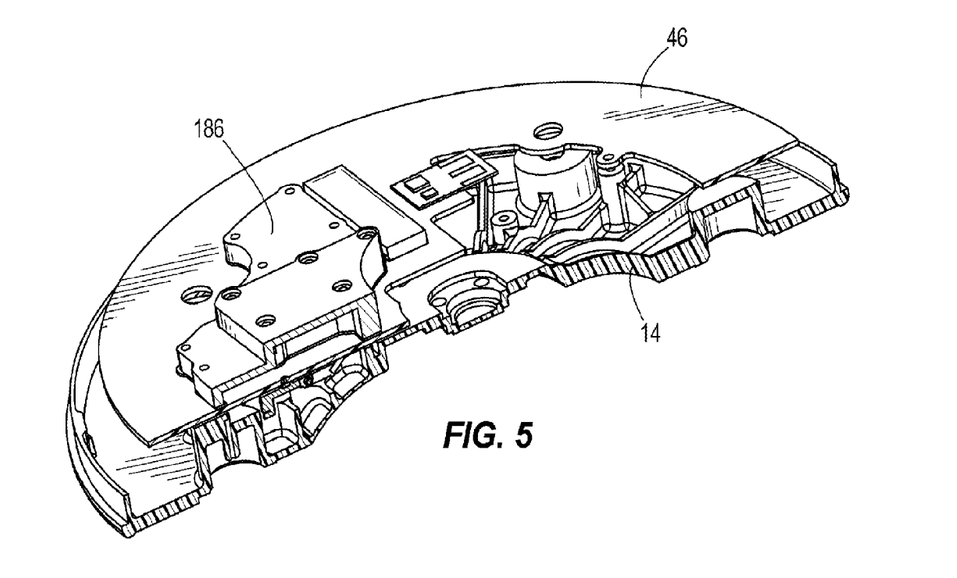
FIG. 5 is a cross-sectional view of a housing and a circuit board of the tire inflation apparatus of FIG. 1.

The tire inflation apparatus 10 includes a housing 14 coupled for co-rotation with a wheel or a wheel assembly of the vehicle (see also FIG. 5). Particularly, the housing 14 is fastened to a hub to which the wheel or wheel assembly is also attached for co-rotation. As such, the tire inflation apparatus 10 is exposed, and facing outwardly on the end face of the hub. The housing 14 may be made from any of a number of different materials (e.g., metals, plastics, etc.) using any of a number of different processes (e.g., casting, molding, etc.).

Figure 3:
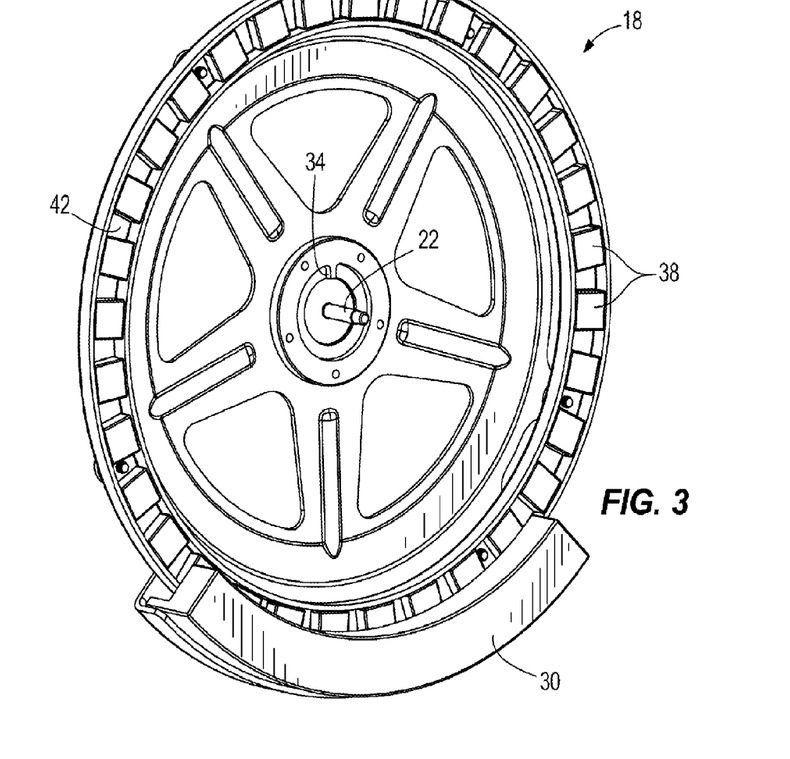
FIG. 3 is a rear perspective view of a pendulum of the tire inflation apparatus of FIG. 1.
Figure 4:
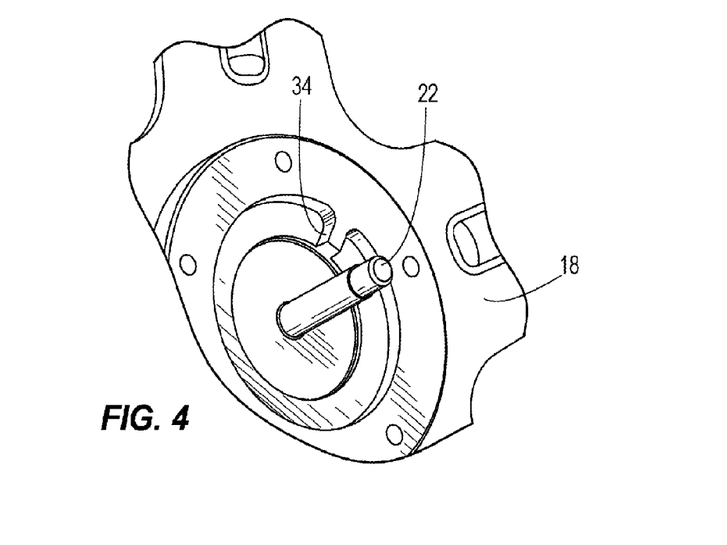
FIG. 4 is an enlarged view of a portion of the pendulum of FIG. 3.

With reference to FIGS. 1-3, the tire inflation apparatus 10 also includes a pendulum 18 coupled to the housing 14 for relative rotation therewith. The pendulum 18 includes an axle 22 (FIG. 4) that is rotatably supported by the housing 14 using a radial bearing 26 (FIG. 2). The pendulum 18 also includes a weight 30 radially offset from the axle 22 for maintaining a substantially continuous orientation of the pendulum 18 as the housing 14, the hub, and the wheel or wheel assembly associated with the tire inflation apparatus 10 are rotated. Particularly, the weight 30 maintains the pendulum 18 substantially in the orientation shown in FIG. 1 as the remainder of the components of the tire inflation apparatus 10 co-rotate with the hub and associated wheel or wheel assembly. The pendulum 18 further includes a projection or dog 34 (FIG. 4) radially spaced from the axle 22, the purpose of which is described below, and a plurality of magnets 38 (FIG. 3) arranged about the circumferential periphery of the pendulum 18. Particularly, the magnets 38 are arranged within an annular channel 42 in the pendulum 18, which not only provides consistent radial spacing of the magnets 38 relative to the axle 22, but also functions as a "flux concentrator" to focus magnetic flux inward toward the housing 14. In the illustrated embodiment of the tire inflation apparatus 10, the magnets 38 are permanent ceramic magnets 38. Alternatively, any of a number of different magnets 38 may be used.

Figure 6:
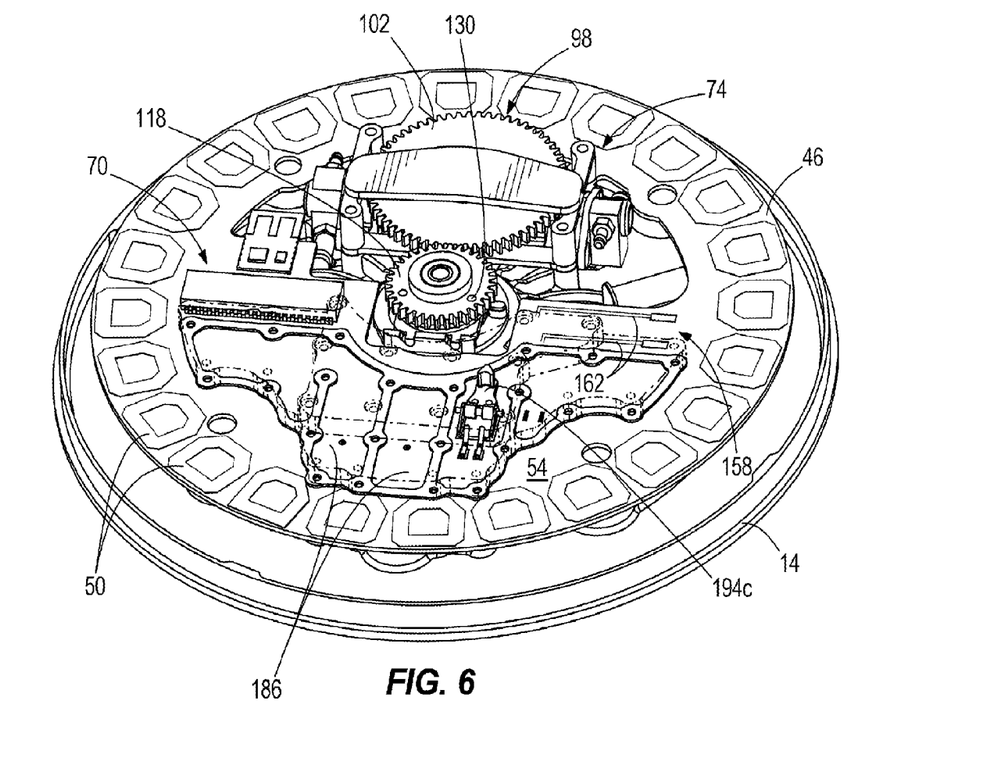
FIG. 6 is a top perspective view of the tire inflation apparatus of FIG. 1 with the pendulum removed for clarity.
Figure 8:
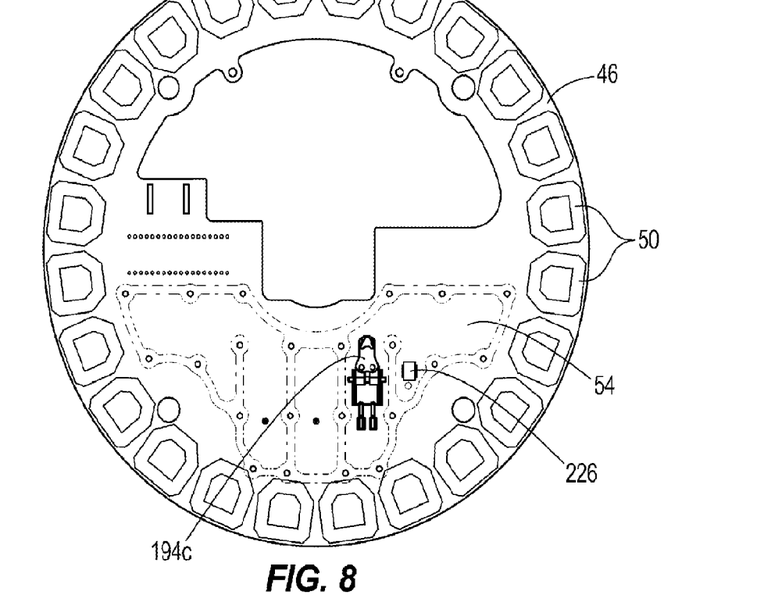
FIG. 8 is a top view of the circuit board of the tire inflation apparatus of FIG. 1.
Figure 9:
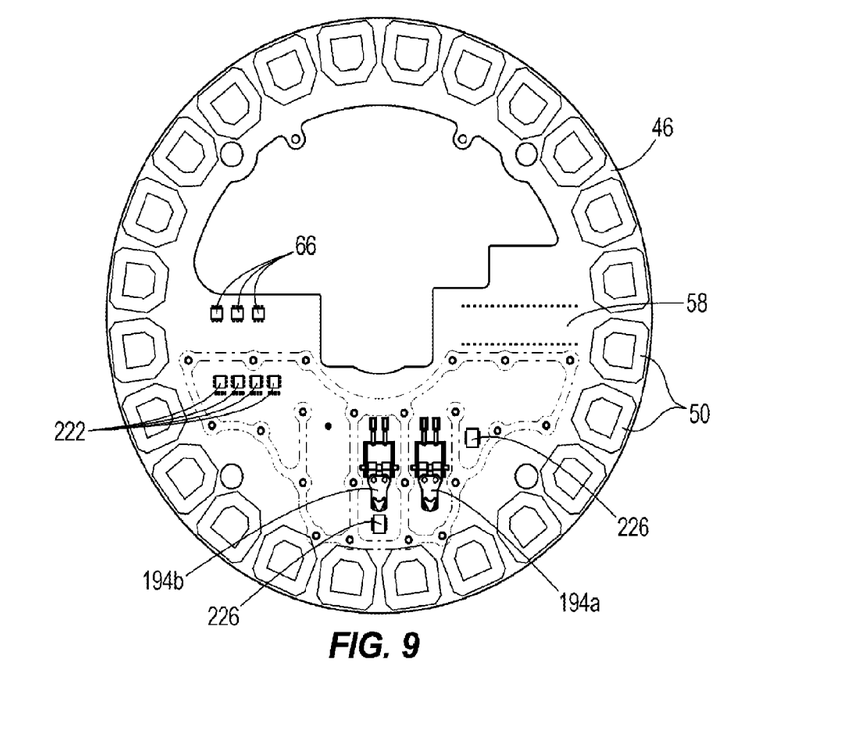
FIG. 9 is a bottom view of the circuit board of the tire inflation apparatus of FIG. 1.

With reference to FIGS. 5 and 6, the tire inflation apparatus 10 further includes a circuit board 46 coupled for co-rotation with the housing 14 (e.g., using fasteners, etc.) and a plurality of induction coils 50 coupled to the circuit board 46. In the illustrated embodiment of the tire inflation apparatus 10, the coils 50 are etched on opposite sides 54, 58 of the circuit board (see also FIGS. 8 and 9) proximate a radially outermost edge of the circuit board 46. As a result, the coils 50 are in facing relationship with the magnets 38 on the pendulum 18 such that the coils 50 sweep past the magnets 38 as the housing 14 and circuit board 46 rotate relative to the pendulum 18. An electrical potential or voltage is generated when the coils 50 move through the magnetic field generated by the magnets 38 on the pendulum 18. Accordingly, the coils 50 and the magnets 38 define a generator 62 (FIGS. 14-17) operable to convert rotational kinetic energy of the hub and wheel or wheel assembly associated with the tire inflation apparatus 10 to electrical energy for powering various electrical components of the tire inflation apparatus 10. The generator 62 outputs three-phase AC electrical power. The tire inflation apparatus 10 also includes a full bridge rectifier 66 (FIG. 9) electrically connected to the circuit board 46 for each of the three phases to convert the AC electrical power to DC electrical power. A controller 70 (FIG. 6) is electrically connected to the circuit board 46 for directing electrical power output by the generator 62 to the electrical components of the tire inflation apparatus 10.

Figure 7:
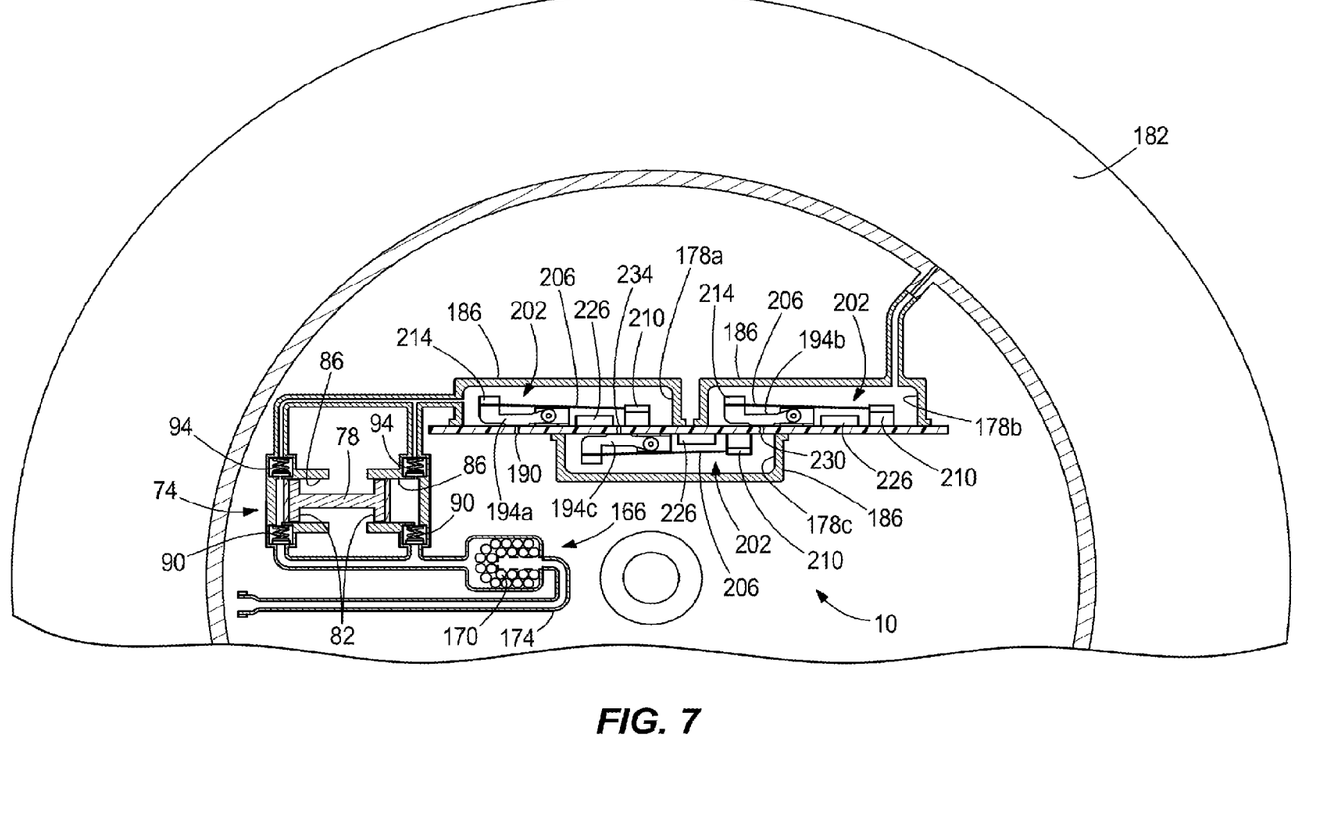
FIG. 7 is a schematic illustrating the tire inflation apparatus of FIG. 1.
Figure 11:
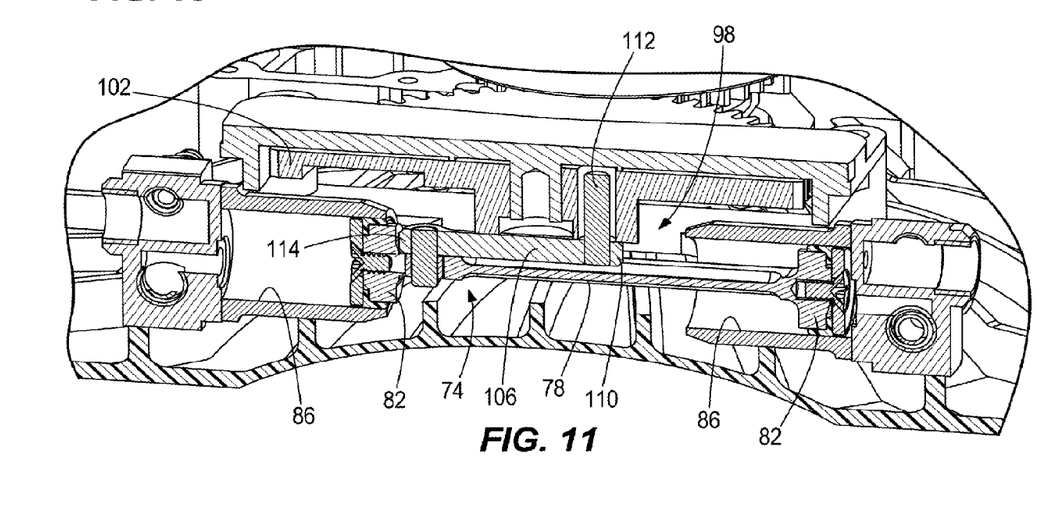
FIG. 11 is a cross-sectional view of a pump of the tire inflation apparatus of FIG. 1.

With reference to FIGS. 7 and 11, the tire inflation apparatus 10 also includes a mechanically actuated pump 74 coupled to the housing 14 and operated in response to relative rotation between the housing 14 and the pendulum 18. In the illustrated embodiment of the tire inflation apparatus 10, the pump 74 is a two-cylinder, single stage pump 74 including a piston 78 having opposed piston heads 82 which, in turn, are received in respective cylinders 86 of the pump 74. An inlet check valve 90 and an outlet check valve 94 are associated with each of the cylinders 86 to allow one of the cylinders 86 to undergo an intake stroke while the other cylinder 86 undergoes a compression stroke. In this manner, discrete volumes of compressed air are alternately discharged from the cylinders 86 through the respective outlet check valves 94 as the piston 78 is reciprocated.

With reference to FIGS. 6 and 11, the tire inflation apparatus 10 further includes a reciprocation mechanism 98 drivably coupled to the pump 74 for operating the pump 74. The reciprocation mechanism 98 includes a driven gear 102 coupled to the housing 14 for relative rotation therewith and a connecting rod 106 (FIG. 11) having a first end 110 pivotably coupled to the driven gear 102 by a pin 112 at a location offset from a rotational axis of the driven gear 102 and a second end 114 pivotably coupled to the piston 78. As such, the second end 114 of the connecting rod 106 is rotated about the rotational axis of the driven gear 102 in response to rotation of the driven gear 102, thereby imparting reciprocation to the piston 78.

With reference to FIG. 6, the tire inflation apparatus 10 includes a drive gear 118 coupled to the housing 14 for relative rotation therewith and meshed with the driven gear 102. In the illustrated embodiment of the tire inflation apparatus 10, the drive gear 118 includes a smaller diameter than the driven gear 102. Accordingly, this transmission ratio yields a reduced rotational speed of the driven gear 102 (i.e., compared to the drive gear 118) and an increased torque on the driven gear 102 for operating the pump 74. Alternatively, the drive gear 118 and the driven gear 102 may be sized in any of a number of different manners to provide a different transmission ratio.

Figure 12:
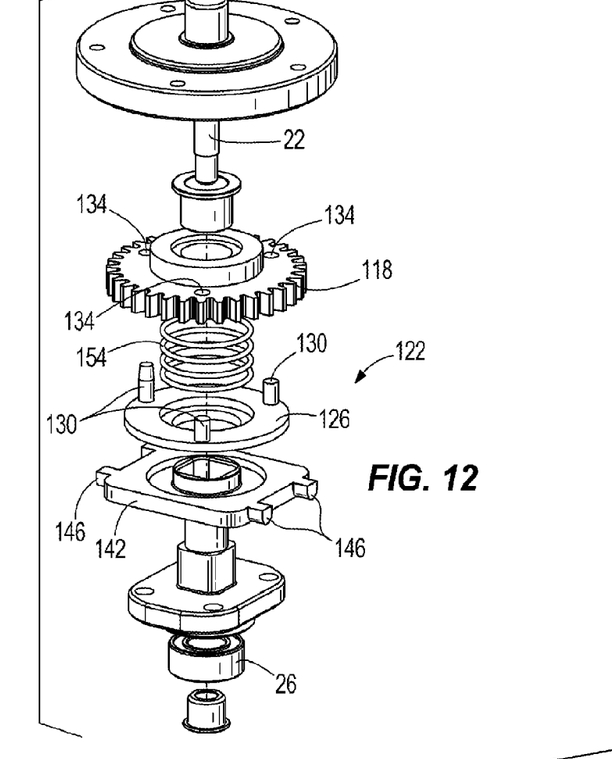
FIG. 12 is an exploded perspective view of a clutch mechanism of the tire inflation apparatus of FIG. 1.
Figure 13:
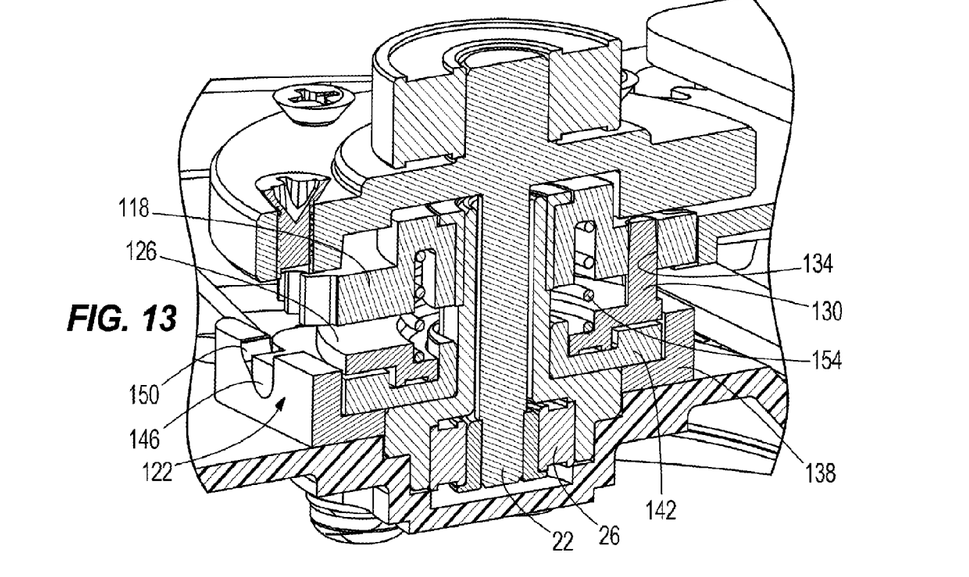
FIG. 13 is an assembled cross-sectional view of the clutch mechanism of FIG. 12.
Figure 14:
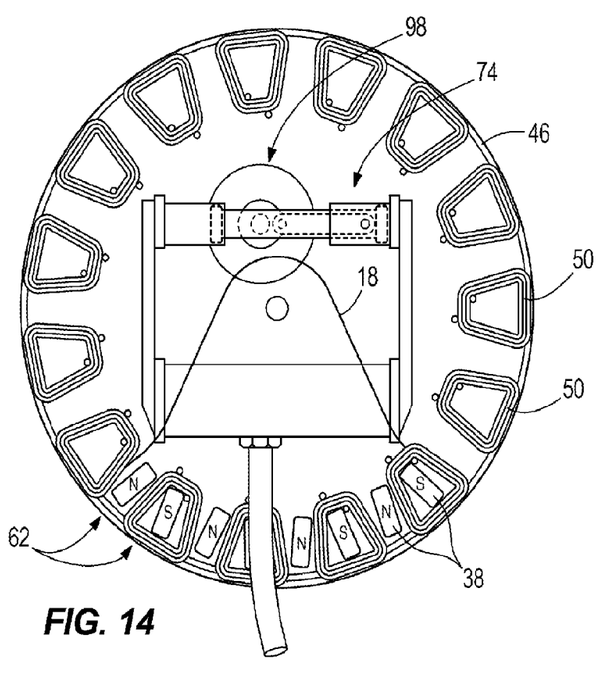
FIG. 14 is a schematic illustrating the tire inflation apparatus of FIG. 1 in a first rotational position.
Figure 15:
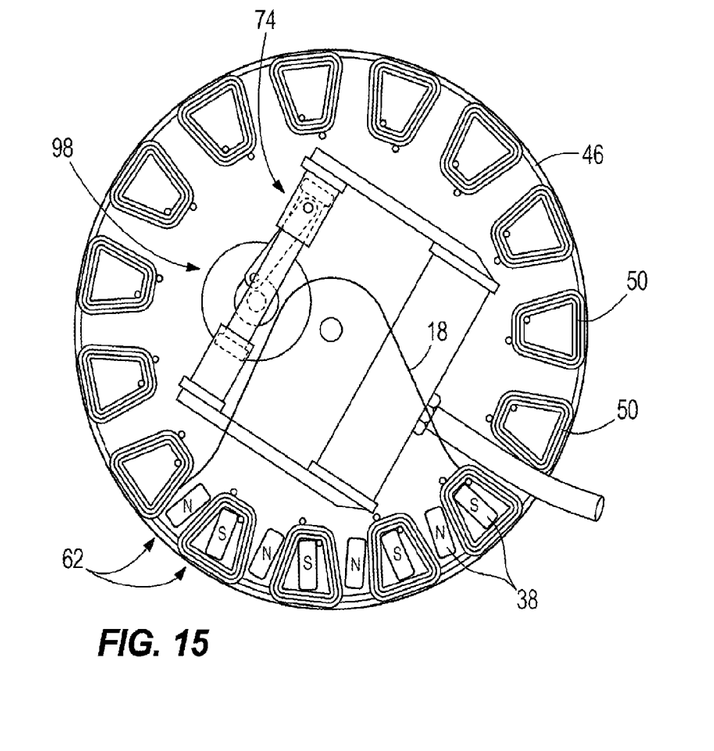
FIG. 15 is a schematic illustrating the tire inflation apparatus of FIG. 1 in a second rotational position.
Figure 16:
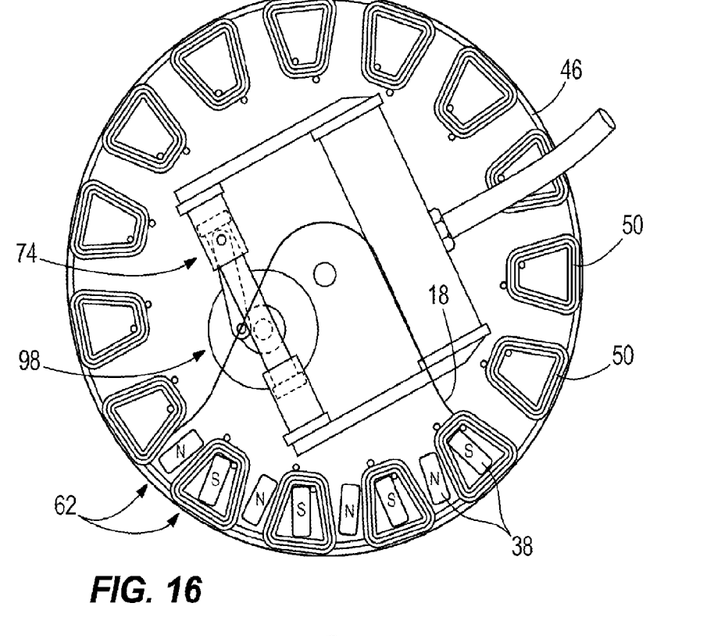
FIG. 16 is a schematic illustrating the tire inflation apparatus of FIG. 1 in a third rotational position.
Figure 17:
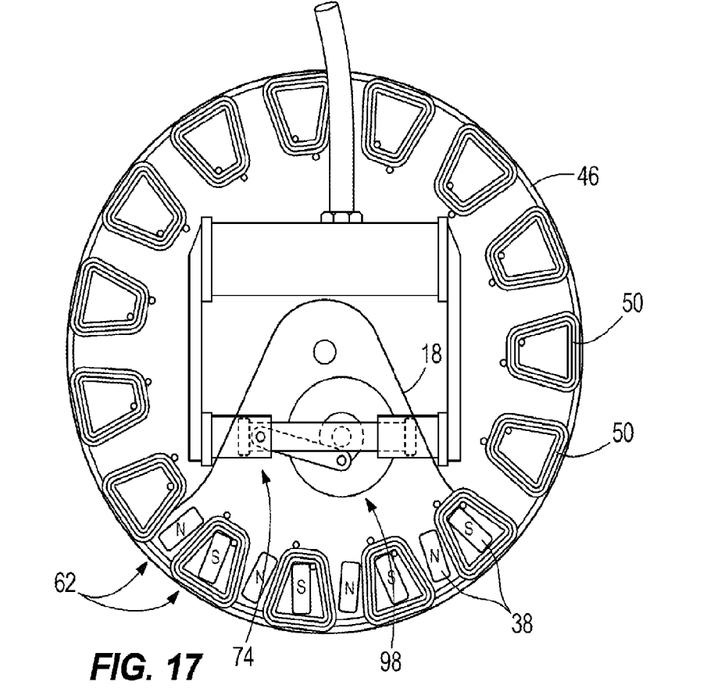
FIG. 17 is a schematic illustrating the tire inflation apparatus of FIG. 1 in a fourth rotational position.

With reference to FIGS. 12 and 13, the tire inflation apparatus 10 also includes a clutch mechanism 122 selectively and drivably coupling the drive gear 118 with the pendulum 18. The clutch mechanism 122 includes a drive plate 126 including three drive pins 130 extending in a direction parallel with a rotational axis of the drive gear 118. The drive pins 130 extend through respective apertures 134 in the drive gear 118 to thereby couple the drive plate 126 and the drive gear 118 for co-rotation. The drive pins 130 are each radially offset from the rotational axis of the drive gear 118 substantially the same distance as the dog 34 is radially offset from the axle 22 of the pendulum 18. The clutch mechanism 122 also includes a cam plate 138 (FIG. 13) coupled for sliding movement relative to the housing 14 and a thrust plate 142 positioned between the drive plate 126 and the cam plate 138. The thrust plate 142 includes multiple followers 146 (FIG. 12) engageable with corresponding cam surfaces 150 (only one of which is shown in FIG. 13) on the cam plate 138 to thereby displace the thrust plate 142 and the drive plate 126, in response to sliding movement of the cam plate 138, between a raised position in which the drive pins 130 extend from the drive gear 118, and a lowered position (shown in FIG. 13) in which the drive pins 130 are retracted into the respective apertures 134 in the drive gear 118.

As will be described in greater detail below, one of the drive pins 130 is engageable with the dog 34 on the pendulum 18 for drivably coupling the drive gear 118 to the pendulum 18 when the drive plate 126 is in the raised position. Thereafter, relative rotation between the housing 14 and the pendulum 18 causes the drive gear 118 to rotate relative to the housing 14, thereby driving the pump 74. When the drive plate 126 is in the lowered position, the drive pins 130 are not engageable with the dog 34 on the pendulum 18. As a result, the drive gear 118 co-rotates with the housing 14 and the pump 74, rendering the pump 74 inoperable.

With reference to FIGS. 12 and 13, the clutch mechanism 122 further includes a compression spring 154 positioned between the drive gear 118 and the drive plate 126 for biasing the drive plate 126 and the thrust plate 142 toward the lowered position, and an electrically powered actuator 158 (FIG. 6) coupling the housing 14 and the cam plate 138 for imparting sliding movement to the cam plate 138 relative to the housing 14 and actuating the drive plate 126 and the thrust plate 142 from the lowered position to the raised position. In the illustrated embodiment of the tire inflation apparatus 10, the electrically powered actuator 158 includes a pair of shape memory alloy wires 162 that contract in response to being heated via resistive heating caused by a current passing through the wires 162 for sliding the cam plate 138 relative to the thrust plate 142 to thereby displace the thrust plate 142 and the drive plate 126 from the lowered position to the raised position. Alternatively, any of a number of different mechanisms may be used for moving the cam plate 138 when it is desired to operate the pump 74.

With reference to FIG. 7, the tire inflation apparatus 10 also includes a filter 166 located upstream of the pump 74. In the illustrated embodiment of the tire inflation apparatus 10, the filter 166 includes a desiccant or drying agent 170 to remove water from the inlet airflow leading to the pump 74. A centrifugal separator 174 is also located upstream of the filter 166 for removing liquid and particulate debris from the inlet airflow leading to the pump 74. Alternatively, the tire inflation apparatus 10 may include any of a number of different filter and/or separator arrangements to remove liquid and particulate debris from the inlet airflow leading to the pump 74.

With continued reference to FIG. 7, the tire inflation apparatus 10 includes three manifolds 178a, 178b, 178c through which pressurized air discharged by the pump 74 must pass consecutively before being transferred to an air chamber between the rim (not shown) and a tire 182. Each of the manifolds 178a-178c is defined at least partially by the circuit board 46 and a cover 186 fastened to the circuit board 46 and/or the underlying housing 14. As such, the pressurized air discharged by the pump 74 is directly exposed to the circuit board 46 in each of the manifolds 178a-178c. A first of the manifolds 178a is in direct fluid communication with an outlet of the pump 74 for storing pressurized air discharged from the pump 74. The circuit board 46 includes an aperture 190 extending between the opposite sides 54, 58 of the circuit board 46, with a first end of the aperture 190 exposed to the first manifold 178a and a second end of the aperture 190 exposed to the atmosphere.

Figure 10:
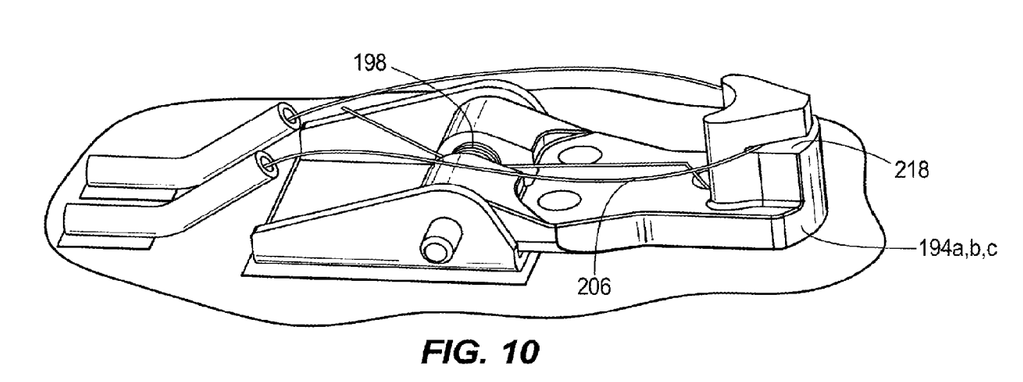
FIG. 10 is a top perspective view of a valve of the tire inflation apparatus of FIG. 1.

A valve 194a is pivotably coupled to the circuit board 46 for selectively blocking the aperture 190. The valve 194a is biased toward a closed position by a resilient member. In the illustrated embodiment of the tire inflation apparatus 10, the resilient member is a torsion spring 198 (FIG. 10). Alternatively, any of a number of different components may be used for biasing the valve 194a toward the closed position. With reference to FIG. 7, the tire inflation apparatus 10 includes an electrically powered actuator 202 for moving the valve 194a from the closed position to an open position. In the illustrated embodiment of the tire inflation apparatus 10, the electrically powered actuator 202 includes a shape memory alloy wire 206 that contracts in response to a current passing through the wire 206 for pivoting the valve 194a in a clockwise direction from the frame of reference of FIG. 7. Particularly, the shape memory alloy wire 206 includes opposite ends anchored to a mount 210 secured to the circuit board 46, and the middle portion of the wire 206 is looped around a head 214 of the valve 194a. The valve head 214 includes a slot 218 (FIG. 10) in which the middle portion of the wire 206 is received so that the wire 206 cannot slip off the valve head 214. Alternatively, any of a number of different mechanisms may be used for moving the valve 194a when it is desired to open the valve 194a. A transistor 222 (FIG. 9) is electrically connected to the circuit board 46, the controller 70, and the shape memory alloy wire 206 for selectively directing a current through the shape memory alloy wire 206. A pressure sensor 226 (FIGS. 7 and 9) is electrically connected to the circuit board 46 within the first manifold 178a for detecting the pressure within the first manifold 178a.

With reference to FIG. 7, a second of the manifolds 178b is in direct fluid communication with the air chamber between the rim and the tire 182. As such, the pressure within the second manifold 178b is the same as the pressure within the tire 182. The circuit board 46 includes an aperture 230 extending between the opposite sides 54, 58 of the circuit board 46, with a first end of the aperture 230 exposed to the second manifold 178b and a second end of the aperture 230 exposed to a third of the manifolds 178c. Another valve 194b is pivotably coupled to the circuit board 46 for selectively blocking the aperture 230. Like the valve 194a, the valve 194b is biased toward a closed position by a resilient member (e.g., a torsion spring 198). A shape memory alloy wire 206 couples the circuit board 46 and the valve 194b for moving the valve 194b from the closed position to an open position in the same manner as the valve 194a. A transistor 222 (FIG. 9) is electrically connected to the circuit board 46, the controller 70, and the shape memory alloy wire 206 for selectively directing a current through the shape memory alloy wire 206. A pressure sensor 226 (FIGS. 7 and 9) is electrically connected to the circuit board 46 within the second manifold 178b for detecting the pressure within the second manifold 178b.

With reference to FIG. 7, the third manifold 178c is in selective fluid communication with the first manifold 178a and the second manifold 178b. The circuit board 46 includes an aperture 234 extending between the opposite sides 54, 58 of the circuit board 46, with a first end of the aperture 234 exposed to the first manifold 178a and a second end of the aperture 234 exposed to the third manifold 178c. Another valve 194c is pivotably coupled to the circuit board 46 for selectively blocking the aperture 234. Like the other valves 194a, b, the valve 194c is biased toward a closed position by a resilient member (e.g., a torsion spring 198). A shape memory alloy wire 206 couples the circuit board 46 and the valve 194c for moving the valve 194c from the closed position to an open position in the same manner as the other valves 194a, b. A transistor 222 (FIG. 9) is electrically connected to the circuit board 46, the controller 70, and the shape memory alloy wire 206 for selectively directing a current through the shape memory alloy wire 206. A pressure sensor 226 (FIGS. 7 and 8) is electrically connected to the circuit board 46 within the third manifold 178c for detecting the pressure within the third manifold 178c.

In operation of the tire inflation apparatus 10, the controller 70 continuously monitors the pressure in the tire 182 using the pressure sensor 226 located in the second manifold 178b which, in turn, is in direct fluid communication with the air chamber between the rim and the tire 182 and therefore has the same pressure as the tire 182. Should the tire pressure drop below a predetermined acceptable range, or drop below a predetermined minimum threshold value, the controller 70 may initiate a series of actions to replenish the tire 182 with compressed air to thereby increase the tire pressure. For example, upon detecting the drop in tire pressure, the controller 70 first detects the pressure within the first manifold 178a by using the pressure sensor 226 in the first manifold 178a. If the pressure within the first manifold 178a is sufficiently high, the controller 70 actuates the valve 194c to thereby transfer compressed air from the first manifold 178a to the third manifold 178c, where it is stored momentarily prior to the valve 194b being opened. Particularly, to actuate the valve 194c, the controller 70 switches the transistor 222 associated with the shape memory alloy wire 206 connected to the valve 194c to an "on" state, thereby conducting a current through the shape memory allow wire 206. The current passing through the shape memory alloy wire 206 heats the wire 206, causing it to contract and develop tension in the wire 206. The tension imparts a torque on the valve 194c against the bias of the torsion spring 198, causing the valve 194c to move from its closed position to an open position to thereby unblock the aperture 234 and permit the compressed air in the first manifold 178a to transfer into the third manifold 178c.

The controller 70 may use the pressure sensor 226 in the third manifold 178c to confirm that the compressed air was successfully transferred into the third manifold 178c. After the valve 194c is allowed to close (i.e., by the controller 70 ceasing the current flow through the wire 206) under action of the torsion spring 198, the controller 70 then actuates the valve 194b in the same manner as the valve 194c to transfer the compressed air from the third manifold 178c to the second manifold 178b. Finally, the controller 70 may use the pressure sensor 226 in the second manifold 178b to confirm that the compressed air was successfully transferred into the second manifold 178b and therefore the tire 182. Should additional compressed air be required to increase the tire pressure above the predetermined minimum threshold value, the controller 70 may actuate the valves 194c, 194b again in sequence provided sufficient compressed air exists in the first manifold 178a.

However, should insufficient pressure exist in the first manifold 178a, the controller 70 actuates the clutch mechanism 122 for drivably coupling the drive gear 118 with the pendulum 18 to thereby operate the pump 74 to replenish the first manifold 178a with compressed air. Particularly, the controller 70 switches a transistor 222 associated with the shape memory alloy wires 162 connected to the cam plate 138 to an "on" state, thereby conducting a current through the shape memory alloy wires 162. The current passing through the shape memory alloy wires 162 heats the wires 162, causing them to contract and develop tension in the wires 162. The tension is sufficiently high to overcome the frictional force between the cam plate 138 and the thrust plate 142 to thereby displace or slide the cam plate 138 relative to the thrust plate 142. The cam surfaces 150 on the cam plate 138 include an inclined contour to impart a transverse displacement to the followers 146, and therefore the thrust plate 142, in response to sliding displacement of the cam plate 138 relative to the thrust plate 142 out of the page from the frame of reference of FIG. 13. The profile of the cam surfaces 150 on the cam plate 138 are designed to ensure that the resultant spring force from the spring 154 acting on the shape memory alloy wires 162 is lower when the thrust plate 142 is in the raised position than when the thrust plate 142 is in the lowered position. This "negative" spring bias is required to ensure that the shape memory alloy wires 162 don't experience fatigue failure after a relatively low number of actuations.

As the thrust plate 142 and drive plate 126 are displaced upwardly from the frame of reference of FIG. 13 toward the raised position against the bias of the spring 154, the drive pins 130 are moved to their extended positions relative to the drive gear 118. Shortly thereafter, one of the drive pins 130 engages the dog 34 on the pendulum 18 which, as described above, is maintained in a substantially continuous orientation by the weight 30 as the remainder of the components of the tire inflation apparatus 10 (including the housing 14 upon which the drive gear 118 is rotatably supported) and the tire 182 co-rotate. Thereafter, relative rotation between the housing 14 and the pendulum 18 causes the drive gear 118 to rotate relative to the housing 14, thereby rotating the driven gear 102 and operating the pump 74 (schematically illustrated in FIGS. 14-17). The pump 74 transfers discrete volumes of compressed air into the first manifold 178a, and the outlet check valves 94 prevent the compressed air in the first manifold 178a from back-flowing into the pump 74.

The controller 70 may operate the pump 74 continuously while the tire 182 is being replenished with compressed air, or the controller 70 may periodically deactivate the pump 74 to allow it to cool. To deactivate the pump 74, the controller 70 ceases current flow through the shape memory alloy wires 162 attached to the cam plate 138, thereby allowing the shape memory alloy wires 162 to cool below their actuation temperatures. The spring 154 is able to elongate the cooled wires 162 a sufficient amount to allow the spring 154 to rebound and return the drive plate 126 and the thrust plate 142 to their lowered positions, all while slidably displacing the cam plate 138 into the page from the frame of reference of FIG. 13 until the followers 146 on the thrust plate 142 resume their lowest positions on the respective cam surfaces 150 on the cam plate 138. When the drive plate 126 is in the lowered position, the drive pins 130 are retracted into the drive gear 118 and therefore disengaged from the dog 34 on the pendulum 18. As a result, the drive gear 118 resumes co-rotation with the housing 14 and the pump 74, rendering the pump 74 inoperable. All of the power used by the tire inflation apparatus 10 for actuating the valves 194a-194c and the clutch mechanism 122 is provided by the generator 62. The electrical power for operating the controller 70 is provided by the generator 62 during operation at speed while the vehicle (e.g., a semi-tractor) is traveling on the road, and may be supplied by an on-board battery when the vehicle is stationary.

The three manifolds 178a, 178b, 178c shown in FIG. 7 ensure that the air within the tire 182 is not unintentionally vented to atmosphere should any one of the valves 194a, 194b, 194c in the respective manifolds 178a, 178b, 178c fail. The pressure sensors 226 in each of the three manifolds 178a, 178b, 178c allows the user of the tire inflation apparatus 10 to monitor the health of all the valves 194a, 194b, 194c and set up a sequence pressurization, manifold pressure sensing, and valve actuations so air can be added and removed from the tire 182 while also ensuring that a failing valve 194a, 194b, 194c does not cause the tire 182 to lose air pressure. The multiple manifolds 178a, 178b, 178c and valves 194*a*, 194*b*, 194*c* therefore provide redundancy to the apparatus 10 that is otherwise unavailable in prior art inflation systems (e.g., a CTIS system). The apparatus 10 may default to a safe mode and alert the operator should a fault, an irregularity, or a condition that would otherwise suggest a problem with any of the valves 194*a*, 194*b*, 194*c* be detected by the pressure sensors 226.

The tire inflation apparatus 10 may be incorporated into a tire pressure monitoring system of a vehicle (e.g., a semi-tractor). Furthermore, the operation of the tire inflation apparatus 10 can be adjusted and monitored using a remote display unit positioned in the cab of the vehicle. A two-way wireless communication protocol (e.g., ZigBee) may be utilized between the individual tire inflation apparatuses 10 on the respective wheel or wheel assemblies of the vehicle and the remote display unit to inform the driver of the operational status of the individual tire inflation apparatuses 10.

The operation and setup of the tire inflation apparatus 10 can also be accomplished with a two way "translator" device mounted in the vehicle cab that translates the incoming and outgoing short range Bluetooth system in an operator's mobile device (e.g., a smart phone) into a longer range protocol (e.g., ZigBee) that is capable of sending and receiving information with tire inflation apparatuses 10 that are outside the range of the Bluetooth signal.

Various features of the invention are set forth in the following claims.

What is claimed is:

1. A tire inflation apparatus for use with a vehicle wheel, the apparatus comprising:
    a housing coupled for co-rotation with the wheel, the wheel including a rim and a tire mounted thereto;
    a pendulum coupled to the housing for relative rotation therewith;
    a mechanically actuated pump coupled to the housing and operated in response to relative rotation between the housing and the pendulum;
    a valve positioned downstream of the pump and movable between a closed position in which pressurized air generated by the pump is prevented from being transferred to an air chamber between the rim and the tire, and an open position in which the pressurized air is transferred to the air chamber;
    an electrically powered actuator coupled to the valve for moving the valve to at least one of the open and closed positions;
    a generator operable to convert rotational kinetic energy of the wheel to electrical energy to power the actuator, wherein the generator includes
        a plurality of magnets coupled to the pendulum, and
        a plurality of induction coils each coupled for co-rotation with the housing and in facing relationship with the magnets;
    a circuit board coupled for co-rotation with the housing, wherein the induction coils are coupled to the circuit board;
    a first manifold in which pressurized air discharged from the pump is stored;
    a second manifold in continuous fluid communication with the air chamber between the rim and the tire; and
    a third manifold into which pressurized air from the first manifold is transferred and stored prior to being transferred into the second manifold.

2. The tire inflation apparatus of claim 1, wherein the valve is positioned in one of the first, second, and third manifolds.

3. The tire inflation apparatus of claim 1, wherein the circuit board at least partially defines at least one of the first, second, and third manifolds.

4. The tire inflation apparatus of claim 3, wherein the circuit board at least partially defines each of the first, second, and third manifolds.

5. The tire inflation apparatus of claim 4, wherein the circuit board includes a first side and an opposite second side, and wherein the first and third manifolds are positioned on the first and second sides of the circuit board, respectively.

6. The tire inflation apparatus of claim 5, wherein the circuit board includes a first aperture extending between the first and second sides for selectively fluidly communicating the first and third manifolds.

7. The tire inflation apparatus of claim 6, wherein the second and third manifolds are positioned on the first and second sides of the circuit board, respectively.

8. The tire inflation apparatus of claim 7, wherein the circuit board includes a second aperture extending between the first and second sides for selectively fluidly communicating the second and third manifolds.

9. The tire inflation apparatus of claim 8, wherein the valve is a first valve positioned in the first manifold, and wherein the apparatus further includes a second valve positioned in the second manifold for selectively blocking the second aperture.

10. The tire inflation apparatus of claim 9, further comprising a third valve positioned in the third manifold for selectively blocking the first aperture.

11. The tire inflation apparatus of claim 10, wherein the circuit board includes a third aperture extending between the first and second sides for selectively fluidly communicating the first manifold with the atmosphere, and wherein the third aperture is selectively blocked by the first valve.

12. The tire inflation apparatus of claim 1, further comprising:
    a first pressure sensor coupled to the circuit board and positioned in the first manifold for detecting pressure in the first manifold,
    a second pressure sensor coupled to the circuit board and positioned in the second manifold for detecting pressure in the second manifold, and
    a third pressure sensor coupled to the circuit board and positioned in the third manifold for detecting pressure in the third manifold.

13. A tire inflation apparatus for use with a vehicle wheel, the apparatus comprising:
    a housing coupled for co-rotation with the wheel, the wheel including a rim and a tire mounted thereto;
    a pendulum coupled to the housing for relative rotation therewith;
    a mechanically actuated pump coupled to the housing and operated in response to relative rotation between the housing and the pendulum;
    a valve positioned downstream of the pump and movable between a closed position in which pressurized air generated by the pump is prevented from being transferred to an air chamber between the rim and the tire, and an open position in which the pressurized air is transferred to the air chamber;
    an electrically powered actuator coupled to the valve for moving the valve to at least one of the open and closed positions, wherein the electrically powered actuator is a shape memory alloy wire, and wherein the shape memory alloy wire contracts in response to a current passing through the wire for moving the valve toward the open position;
a generator operable to convert rotational kinetic energy of the wheel to electrical energy to power the actuator;
a resilient member biasing the valve toward the closed position; and
a circuit board coupled for co-rotation with the housing, wherein the shape memory alloy wire includes at least one end anchored to the circuit board.

14. The tire inflation apparatus of claim 13, wherein the valve is pivotably coupled to the circuit board.

15. The tire inflation apparatus of claim 1, wherein the pump is a two-cylinder, single stage pump.

16. A tire inflation apparatus for use with a vehicle wheel, the apparatus comprising:
a housing coupled for co-rotation with the wheel, the wheel including a rim and a tire mounted thereto;
a pendulum coupled to the housing for relative rotation therewith;
a mechanically actuated pump coupled to the housing and operated in response to relative rotation between the housing and the pendulum;
a valve positioned downstream of the pump and movable between a closed position in which pressurized air generated by the pump is prevented from being transferred to an air chamber between the rim and the tire, and an open position in which the pressurized air is transferred to the air chamber;
an electrically powered actuator coupled to the valve for moving the valve to at least one of the open and closed positions, wherein the electrically powered actuator is a shape memory alloy wire, and wherein the shape memory alloy wire contracts in response to a current passing through the wire for moving the valve toward the open position;
a generator operable to convert rotational kinetic energy of the wheel to electrical energy to power the actuator;
a reciprocation mechanism drivably coupled to the pump for operating the pump, wherein the reciprocation mechanism includes a driven gear coupled to the housing for relative rotation therewith and a connecting rod pivotably coupled to the driven gear at a location offset from a rotational axis of the driven gear;
a drive gear coupled to the housing for relative rotation therewith and meshed with the driven gear; and
a clutch mechanism selectively drivably coupling the drive gear with the pendulum.

17. The tire inflation apparatus of claim 16, wherein the pump includes a piston, wherein a first end of the connecting rod is pivotably coupled to the driven gear, and wherein a second end of the connecting rod is pivotably coupled to the piston for imparting reciprocation to the piston in response to rotation of the driven gear.

18. The tire inflation apparatus of claim 16, wherein the clutch mechanism includes a drive pin selectively drivably coupling the drive gear to the pendulum, and wherein the drive pin is movable between a first position in which the drive pin is engaged with the pendulum, and a second position in which the drive pin is disengaged from the pendulum.

19. The tire inflation apparatus of claim 18, wherein the pendulum includes an axle, and wherein the axle is rotatably supported by the housing at a location coaxial with the drive gear.

20. The tire inflation apparatus of claim 19, wherein the drive pin is offset from a rotational axis of the drive gear.

21. The tire inflation apparatus of claim 20, wherein the pendulum includes a projection in facing relationship with the drive gear and radially offset from the axle a sufficient amount to be engageable by the drive pin when the drive pin is in the first position.

22. The tire inflation apparatus of claim 18, wherein the clutch mechanism further includes
a drive plate from which the drive pin extends in a direction parallel with a rotational axis of the drive gear, the drive pin extending through an aperture in the drive gear to thereby couple the drive plate and the drive gear for co-rotation,
a cam plate coupled for sliding movement relative to the housing and including a cam surface, and
a thrust plate positioned between the drive plate and the cam plate, the thrust plate including a follower engageable with the cam surface to thereby displace the thrust plate and the drive plate, in response to sliding movement of the cam plate, between a raised position in which the drive pin is situated in the first position and extends from the drive gear, and a lowered position in which the drive pin is situated in the second position and is at least partially retracted into the aperture in the drive gear.

23. The tire inflation apparatus of claim 22, wherein the clutch mechanism further includes a compression spring positioned between the drive gear and the drive plate for biasing the drive plate and the thrust plate toward the lowered position.

24. The tire inflation apparatus of claim 1, wherein the circuit board includes opposite sides, and wherein the coils are etched on both sides of the circuit board.

25. The tire inflation apparatus of claim 1, wherein the induction coils are located proximate a radially outermost edge of the circuit board.

26. The tire inflation apparatus of claim 1, wherein the generator outputs three-phase electrical power, and wherein the apparatus further includes a full bridge rectifier coupled to the circuit board for each of the three phases.

27. The tire inflation apparatus of claim 13, wherein the resilient member is a torsion spring.

28. The tire inflation apparatus of claim 22, further comprising a second electrically powered actuator coupling the housing and the cam plate for imparting sliding movement to the cam plate relative to the housing.

29. The tire inflation apparatus of claim 28, wherein the second electrically powered actuator is a shape memory alloy wire, and wherein the shape memory alloy wire contracts in response to a current passing through the wire for sliding the cam plate relative to the housing and the thrust plate to thereby displace the thrust plate between the raised and lowered positions.

30. The tire inflation apparatus of claim 1, further comprising:
a controller coupled to the circuit board for directing electrical power output by the generator to the electrically powered actuator.

31. The tire inflation apparatus of claim 1, wherein the pendulum includes a weight offset from a rotational axis of the pendulum for maintaining a substantially continuous orientation of the pendulum as the housing and wheel are rotated.

32. The tire inflation apparatus of claim 1, further comprising a filter located upstream of the pump.

33. The tire inflation apparatus of claim 32, further comprising a centrifugal separator located upstream of the filter for removing liquid and particulate debris from an inlet airflow leading to the pump.

\* \* \* \* \*